United States Patent [19]

Smith et al.

[11] Patent Number: 4,563,483

[45] Date of Patent: Jan. 7, 1986

[54] CONCRETE CLEANING COMPOSITION

[75] Inventors: James A. Smith, Old Tappan; Betty J. Murphy, Upper Montclair, both of N.J.

[73] Assignee: Creative Products Resource Ltd., Clifton, N.J.

[21] Appl. No.: 511,185

[22] Filed: Jul. 6, 1983

[51] Int. Cl.[4] .................. C08G 18/14; C08G 18/16
[52] U.S. Cl. .................. 521/111; 521/159; 521/905; 521/122; 521/918; 521/123; 521/76; 521/52; 210/924
[58] Field of Search ............. 521/111, 159, 905, 122, 521/918, 123, 76; 210/924

[56] References Cited

U.S. PATENT DOCUMENTS

| | | | |
|---|---|---|---|
| 3,242,109 | 3/1966 | Showalter | 521/122 |
| 3,598,772 | 8/1971 | Hood et al. | 521/170 |
| 3,810,841 | 5/1974 | Richter | 252/91 |
| 3,833,386 | 9/1975 | Wood et al. | 106/41 |
| 3,861,993 | 1/1975 | Guthrie | 161/159 |
| 3,888,766 | 6/1975 | De Young | 521/905 |
| 3,890,254 | 6/1975 | Guthrie | 521/159 |
| 4,059,666 | 11/1977 | Fowler | 264/129 |
| 4,066,394 | 1/1978 | Leonard | 8/137 |
| 4,066,578 | 1/1978 | Murch et al. | 521/123 |
| 4,137,200 | 1/1979 | Wood et al. | 521/159 |
| 4,160,076 | 7/1979 | Guthrie et al. | 521/159 |
| 4,271,272 | 6/1981 | Strickman et al. | 521/905 |
| 4,309,509 | 1/1982 | Wood | 521/132 |
| 4,343,910 | 4/1980 | Bush, Jr. et al. | 522/82 |
| 4,421,526 | 12/1983 | Strickman et al. | 51/296 |

*Primary Examiner*—John Kight
*Assistant Examiner*—Marvin L. Moore

[57] ABSTRACT

A water and oil absorbant concrete cleaning composition is disclosed comprising shreds of a hydrophilic, open-celled, solids-loaded polyurethane foam. Methods are also disclosed to bind the solids to the cellular foam matrix.

24 Claims, 4 Drawing Figures

CONCRETE CLEANING COMPOSITION

BACKGROUND OF THE INVENTION

Flooring in workplace or storage areas in which oil and water spills commonly occur is often made of a refractory, porous substance such as concrete, stone or brick. Use of such materials is desirable due to their load-bearing capacity and resistance to harsh chemicals but such floors are likewise difficult to clean, being porous and uneven.

Previously, porous minerals such as bentonite and vermiculite have been used to clean up oil and water spills on such surfaces. However, the use of mineral particles which are large enough to be easily removed from the floor results in a relatively small surface area of the particles being available to contact and absorb the spilled oil, while the use of fine particles results in a gummy caked mass which is difficult to remove from the floor surface and dispose of. Also clay and other particulate minerals do not function to remove oil which has become absorbed into the porous floor.

The preparation of open-celled, hydrophilic polyurethane foams by the reaction of specially-formulated prepolymer resins with large excesses of water without the need for added catalysts or cross-linking agents is disclosed in U.S. Pat. Nos. 3,890,254; 4,137,200 and 4,160,076. These resins permitted the introduction of large amounts of solids into the foam matrices via preformed aqueous slurries of solid particles which were subsequently reacted with the prepolymer resin in order to foam it into the desired specialty product.

Such products are disclosed in U.S. Pat. Nos. 3,833,386; 4,066,394; 4,066,578; 4,309,509 and 3,343,910 which describe the incorporation into hydrophilic foams of sinterable ceramic materials, water-softening minerals such as zeolites, flame retardants, odorant-containing waxes and fine abrasives, respectively. The resultant foamed products are produced so as to exhibit satisfactory overall integrity for use in polishing pads, sachets, laundry sponges, cushions and the like.

Desirable qualities in such products include high tensile strength, compressibility and a fine or even cell structure. Although hydrophobic, or petrophilic polyurethane fibers have been disclosed to be useful to absorb oil from oil-water sludges, there has heretofore been no indication that the solids-containing foams prepared as described above would be useful for such purposes, probably due to their strong hydrophilicity.

Therefore, it is an object of the present invention to provide a composition suitable for cleaning concrete flooring which has been soiled by oil spillage, the term "concrete" as used herein to include any hard, porous material such as stone, brick, tile, plaster and the like. The term "oil" as used herein is intended to include any liquid, viscous, nonpolar chemicals, and is not limited to petroleum distillates.

It is a further object of the present invention to provide a solids-containing, open-celled, reticulated hydrophilic foamed product suitable for absorbing oil and/or water spills on concrete surfaces.

BRIEF DESCRIPTION OF THE INVENTION

The objects of the present invention are accomplished by an oil and water absorbent concrete cleaning composition formed by shredding a friable, hydrophilic, open-celled, solids-loaded polyurethane foam. Foams useful for forming the present compositions are prepared by foaming a polyurethane prepolymer resin which contains at least two free isocyanate groups per resin molecule with an aqueous reactant phase comprising a slurry of solid abrasive particles and which slurry also comprises an amount of nonionic surfactant effective to produce the desired open-celled network.

The solid particles will also have been pretreated with a silane-coupling agent which functions to bind the particles into the polyurethane foam matrix. Although polyurethane foams useful in the present invention may be foamed from aqueous slurries which comprise up to about 80% by weight of the silane-treated particles, an amount of abrasive equal to about 40–60% of the total slurry weight is preferred, since this range of particles resists separation from the polymeric matrix when the foam shreds are spread over an oil spill and removed, while imparting effective scouring power to the cleaning composition.

Therefore, the present cleaning compositions consist of solids-loaded foam fragments which are formed by chopping or shredding a dense, friable foam bun which is formed by mixing the aqueous slurry with the prepolymer so that the final mole ratio of water to the total free isocyanate groups on the prepolymer molecules is within the range of about 5–100:1. These amounts of water react with the free isocyanate groups to release carbon dioxide which blows the prepolymer into a cross-linked, open-celled foam which is rendered hydrophilic by entrapment of excess water in the cell walls of the foam matrix.

The particles of the suspended abrasive are also bound into the cell walls by the action of reactive groups on the coupling agent. When the prepolymer-slurry mixture is allowed to set in molds, a dense, friable foam bun is formed which is easily shredded or chopped into foam particles of the desired size. As used herein, the term "bun" is intended to include any of the foamed bodies which may be shredded to yield the present product, such as films, slab stock, and the like.

While the hydrophilicity of the present compositions is to be expected in view of the chemical composition of the prepolymer resin and the excess of water used to foam it, it has unexpectedly been found that the foam shreds will readily and effectively absorb and hold large amounts of viscous hydrophobic liquids, such as oily chemicals, crankcase oil, lubricating oil, transmission fluid, sludges, brake fluid, mineral oils and the like. Furthermore, preferred embodiments of the present composition will also effectively remove oil absorbed into porous surfaces, as well as fresh oil spills which remain on the surface to be cleaned. This effect is thought to be due in part to the strong wicking action exerted by the connecting passages between the cells. These passages are formed during foaming by the surfactant-assisted opening of the cell membrane walls. These walls, or windows, do not tear away completely, but remain connected to the reticulated foam framework to provide tubular passageways which exert a strong capillary action on a liquid spill, even when the liquid has been partially absorbed by porous flooring such as concrete.

In preferred cleaning compositions prepared according to the present invention, the torn windows of the outermost cells cure with irregular or jagged edges. These edges act to further increase the effective surface area of the foam shreds and enhance the already strong wicking action of the composition.

Both the surface-and deep-cleaning activity of the present compositions are enhanced by incorporating an effective amount of one or more detergents or surfactants and, optionally, a nonpolar solvent in the aqueous phase used to form the foams. The water in excess of that required to foam the resin is entrapped within the cell walls of the foam. This water, along with the surfactant and the nonpolar solvent, is partially released when the foam shreds are contacted with the soiled surface under conditions of pressure, such as by sweeping or rubbing the shreds over the spill area. The surfactant acts both to disperse the nonpolar, i.e., hydrocarbon, solvent in the aqueous phase as well as to allow the aqueous phase to wet the oily spill area. The surfactant then functions to disperse the oil in the aqueous phase, which is then reabsorbed by the foam shreds. When present, the hydrocarbon solvent also helps to dissolve and remove the oil.

DETAILED DESCRIPTION OF THE INVENTION

Figure 1:
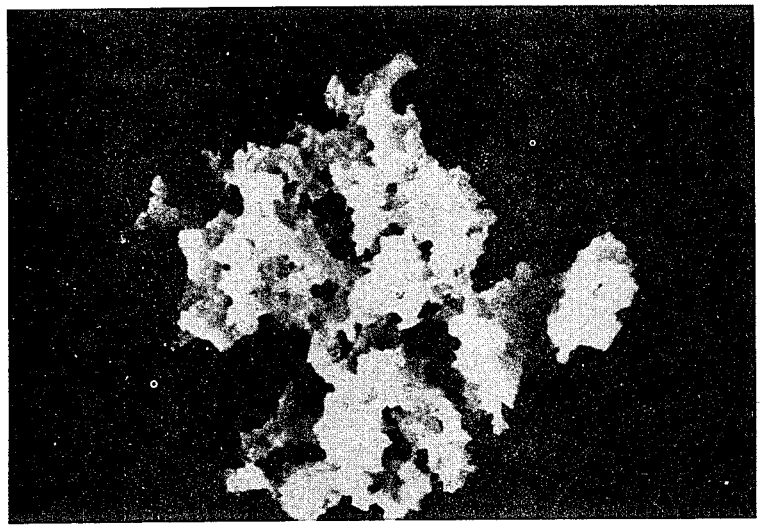

The concrete cleaning compositions of the present invention are prepared by a process comprising forming an aqueous slurry which includes solid abrasive particles which have been treated with a silane-coupling agent. The slurry further includes an amount of surfactant effective to form an open-celled foam upon reaction of the aqueous phase with a water-foamable polyurethane prepolymer resin. The surfactant also functions to allow the aqueous phase incorporated within the cell walls to wet the spill area and to disperse or dissolve the spilled oil.

In the practice of the present invention, nonionic surfactants are preferred. The aqueous phase may further comprise additional foam-forming and structuring agents such as silicone fluids, additional surfactants, hydrocarbon solvents and the like which also act to build the cleaning power of the finished composition. The fully-formed aqueous slurry is then combined with a water-foamable prepolymer resin and the reaction mixture allowed to foam and cure to form a self-cross-linked, open-celled, friable polyurethane bun. The bun is chopped or shredded to form the particular foam compositions of the present invention.

A preferred class of water-foamable prepolymer resins which yield cross-linked, hydrophilic polyurethane foams upon the addition of water are those belonging to the commercially-available Hypol® series, available from W. R. Grace & Co. (FHP 3000, 2000, 2000 HD, 2002) and which are generally described in U.S. Pat. No. 4,137,200, the disclosure of which is incorporated by reference herein. These liquid resins are prepared by capping mixtures of polyols having 3-8 hydroxyl groups and polyoxyethylene diols with toluene diisocyanate. The capped alcohol mixtures have an average number of free isocyanate groups per molecule which is equal to two or more, i.e., 2–8.

These resins possess molecular weights within the range of about 1300–1400 and have about 1.5–2.5 mEq./g of free isocyanate groups. Upon being contacted with a molar excess of water, the isocyanate groups hydrolyze to release carbon dioxide gas, thus foaming the resin without the need for added catalysts or blowing agents. The free amino groups formed by the hydrolysis reaction react with unhydrolyzed isocyanate groups to form ureido groups which cross-link and stabilize the foam, while entrapping a part of the excess water in the cell walls, where it acts to enhance the hydrophilic properties of the foam. The compatibility of the foam matrix with large molar excesses of water is a necessary requirement of resins useful in the practice of the present invention, since large amounts of water are needed to uniformly introduce large amounts of abrasive material into the matrix.

Although the Hypol® class of resins have been found to form useful shreddable foam products upon foaming with aqueous phases prepared according to the present invention, other chemically-analogous polyoxy-$C_2$-$C_3$-alkylene ethers or esters capped with aromatic isocyanates may be prepared which possess a suitable balance between their extent of cross-linking prior to foaming and their ability to cross-link or to further cross-link during foaming (due to the presence of more than two isocyanate groups per resin molecule), so as to be useful in the practice of the present invention. One such commercially-available resin is TRE STD® or TRE® A31 polymer (Twin Rivers Engineering Co., East Booth Bay, Me.), which forms acceptable foams upon reaction with a stoichiometric excess of water without employing an isocyanate-capped triol component to raise the average number of free isocyanate groups to above two.

In the practice of the present invention, useful foams may be formed employing a weight ratio of water to polymer of 0.5–3.0:1, preferably 0.5–2.75:1. These ranges yield a mole ratio of water to free isocyanate groups of about 5–100:1, preferably about 10–70:1.

Particulate abrasive solids are employed as components of the present cleaning compositions and are dispersed and bound throughout the foam matrix by silane-coupling agents as described below. The choice of abrasive material may be made from a wide variety of materials of adequate hardness and of a particle size range which will enable them to effectively scour the concrete, brick or stone surfaces and to loosen dirt or other debris held thereto by the oil. The solids will preferably comprise about 25–65% by weight of the aqueous reactant phase, most preferably about 40–60%, but much less abrasive may be used in some compositions while still obtaining a beneficial effect, i.e., as little as 1–5% in the case of certain extremely abrasive materials such as carborundum or zirconium oxides. The weight ratio of abrasive to prepolymer which may be used is limited only by the ability of the foamed polymeric matrix to retain the abrasive particles without undue separation and loss of the solid during preparation, shipping or use. Preferably, the weight of the abrasive used will be from about 50–500% of the prepolymer weight, most preferably 200–300%. On a dry-weight basis, the foam buns or shreds of the present invention will preferably contain about 30–80% by weight of solids, most preferably about 40–70%. A preferred abrasive for use in the foams of the present invention is F-4 feldspar (170–200 mesh) available from International Minerals and Chemical Corporation, Mundelein, Ill.

Due to the necessity of employing a silane-coupling agent to effectively bind the preferred amounts of abrasive particles to the foam matrix, abrasive particles are preferably chosen from those substances which possess sufficient free surface Si—OH or Al—OH groups to form reactive sites for the silane-coupling agents. Among the substances that meet this requirement are the feldspar minerals, clays, quartz, aluminas, diatomaceous earths, sands, glasses, naturally-occurring and synthetic zeolites, zircon, carborundum, pumice and the like, which may be used singly or in mixtures. The silane-treated abrasive solids are preferably introduced into the present cleaning compositions as components of the aqueous reactant phase, in which they are suspended prior to the foaming reaction, as described hereinbelow.

The compositions of the present invention will also include a minor but effective amount of a silane-coupling agent which functions to bond to both the polyurethane matrix and the surface of the particles of the inorganic abrasive, thus chemically-coupling the abrasive into the polymeric matrix and preventing the abrasive particles from separating from the foam matrix during shredding, packaging or use. Silane-bound solid particles also clump less readily and so are more evenly dispersed throughout the matrix during foaming.

Useful silane-coupling agents may be selected from members of organosilicon monomers such as aminoalkyl(trisalkoxy)silanes which are characterized by the formula $R-SiX_3$, wherein R is an organofunctional group attached to silicon in a hydrolytically stable manner and X designates hydrolyzable groups which are converted to silanol groups upon hydrolysis. Most commonly, R comprises 3-aminopropyl or 3-ureidopropyl moiety which may be further separated from the silicon group by one or two $-NH(CH_2)-_n$ moieties wherein n=1-2. Preferably X is an alkoxy group selected from the group consisting of methoxy, ethoxy, 2-methoxyethoxy or is acetoxy. Preferred silane-coupling agents are commercially-available from Union Carbide as the A1100-A1160 series which includes 3-aminopropyltriethoxysilane, 3-aminopropyltrimethoxysilane (also available from Dow Corning as Z-6020), N-2-aminoethyl-3-aminopropyl-trimethoxysilane, or 3-ureidopropyl-triethoxysilane.

The silane-coupling agents are commonly employed in the art by spraying them directly onto a tumbling mass of heated solid particles as aqueous solutions wherein the water acts to hydrolyze the alkoxy groups to hydroxy groups which then bind to free hydroxy groups on the surface of the typically silaceous or aluminate abrasive particles. If its viscosity is low enough to permit effective mixing, the polyurethane prepolymer is then added to the tumbling mass, at which point the free amino groups on the coupling agent react with free isocyanate groups on the polymer chains to bind the solid particles to the polymer, which then may be foamed in the usual manner. However, difficulties are often encountered when the coupling agent is dissolved in water. Prior to reaction with the solid particles, the hydrolyzed silane solutions may react by self-polymerization to form insoluble inert beadlets. If the solid particles are coated with neat silane prior to being treated with water, any non-homogeneity in the coating can lead to the same result.

Surprisingly, we have found that this problem can be overcome by first forming a thick slurry of the abrasive particles with about 50% or less by weight of the total water used to form the aqueous phase. The aqueous slurry, which may contain up to about a 500% weight excess of abrasive particles is then treated with an amount of the silane-coupling agent equal to about 0.1-5% by weight of the amount of slurried solid. Completion of the hydrolysis reaction is assured by heating the slurry to at least about 70°-90° F. at which point the other components of the aqueous phase, e.g., surfactants, foam structuring agents, solvents and the like may be added, along with the remainder of the water. When the abrasive solid particles are coated in this fashion, the free amino groups of the coupling agent bind to the polymeric chains of the substrate during the foaming step, i.e., when the aqueous reactant phase and the polyurethane prepolymer are mixed together.

Although silane-coupling agents in which R comprises an amino-group are particularly well adapted for suspending solids in polyurethane foams, the present method of treating an aqueous slurry of the solid particles with the coupling agent prior to combining the aqueous phase with the prepolymer reactant would be expected to be generally applicable to other cross-linkable polymers comprising functional groups which can react with the R-amino group of the silane or with an R group which comprises a terminal vinyl, vinylphenyl, propenyl or haloalkyl moiety. The reaction may be catalyzed, or preferably is self-catalyzing. Although silane-coupling agents are employed in the context of the present invention to link abrasive particles to the foam matrix, the agents are also useful to suspend particles of fillers, detergent builders, fireproofing agents, glass fibers, zeolites, metal powders and the like.

Although satisfactory solids-loaded foams may be produced in some cases simply by mixing appropriate amounts of the prepolymer with the aqueous phase, it is greatly preferred to incorporate a minor amount of one or more foam-reticulating surfactants into the aqueous phase. The surfactant functions to remove the window membranes of the foam cells, thus producing the desired recticulated, or highly open, structure. The surfactant also functions to enhance the cleaning power of the finished composition by dispersing the oily spill when the foam-absorbed aqueous phase contacts the spill area. Foam reticulating surfactants are preferably selected from nonionic types which are soluble or dispersible in water. Such nonionic surfactants include the condensation products of ethylene oxide with a hydrophobic polyoxyalkylene base formed by the condensation of propylene oxide with propylene glycol. The hydrophobic portion of these compounds has a molecular weight sufficiently high so as to render it water-insoluble. The addition of polyoxyethylene moieties to this hydrophobic portion increases the water-solubility of the molecule as a whole, and the liquid character of the product is retained up to the point where the polyoxyethylene content is about 50% of the total weight of the condensation product. Examples of compounds of this type include certain of the commercially-available Pluronic ® surfactants (BASF Wyandotte Corp.), especially those in which the polyoxypropylene ether has a molecular weight of about 1500-3000 and the polyoxyethylene content is about 35-55% of the molecule by weight.

Other useful nonionic surfactants include the condensation products of $C_8-C_{22}$ alkyl alcohols with 2-50 moles of ethylene oxide per mole of alcohol. Examples of compounds of this type include the condensation products of $C_{11}-C_{15}$ secondary alkyl alcohols with 3-40 moles of ethylene oxide per mole of alcohol which are commercially-available as the Tergitol ® series from Union Carbide.

Other nonionic surfactants which may be employed include the ethylene oxide esters of $C_6-C_{12}$ alkyl phenols such as (nonylphenoxy)polyoxyethylene ether, the ethylene oxide esters of alkyl mercaptans such as dodecyl mercaptan polyoxyethylene thioether, the ethylene oxide esters of acids such as the lauric ester of polyethylene glycol and the lauric ester of methoxypolyethylene glycol, the ethylene oxide ethers of fatty acid amides, the condensation products of ethylene oxide with partial fatty acid esters of sorbitol such as the lauric ester of sorbitan polyethylene glycol ether, and other similar materials, wherein the mole ratio of ethylene oxide to the acid, phenol, amide or alcohol is about 5–50:1.

The total amount of nonionic surfactant which is used to reticulate the present foams is preferably about 0.1–10%, most preferably 1–5% by weight of the aqueous phase.

In addition to a nonionic surfactant, it has been found desirable in some cases to employ an amount of one or more cationic, anionic or amphoteric surfactants effective to control the cell size of the foam and to aid in the formation of uniform cells, e.g., in amounts equal to about 0.5–5% by weight of the aqueous phase. Of the classes of these optional surfactants, the anionic surfactants are preferred and may include anionic detergent salts having alkyl substituents of 8 to 22 carbon atoms such as the water-soluble higher fatty acid alkali metal soaps, e.g., sodium myristate and sodium palmitate; water-soluble sulfated and sulfonated anionic alkali metal and alkaline earth metal detergent salts containing a hydrophobic higher alkyl moiety (typically containing from about 8 to 22 carbon atoms) such as salts of higher alkyl mono or polynuclear aryl sulfonates having from about 1 to 16 carbon atoms in the alkyl group (e.g., sodium dodecylbenzenesulfonate, magnesium tridecylbenzenesulfonate, lithium or potassium pentapropylenebenzenesulfonate); alkali metal salts of alkyl naphthalene sulfonic acids (methyl naphthalene sodium sulfonate, Petro ® AA, Petrochemical Corporation); sulfated higher fatty acid monoglycerides such as the sodium salt of the sulfated monoglyceride of coconut oil fatty acids and the potassium salt of the sulfated monoglyceride of tallow fatty acids; alkali metal salts of sulfated fatty alcohols containing from about 10 to 18 carbon atoms (e.g., sodium lauryl sulfate and sodium stearyl sulfate); alkali metal salts of sulfated ethylenoxy-derivatized fatty alcohols (the sodium or ammonium sulfates of the condensation products of about 3 mole of ethylene oxide with a $C_{12}$-$C_{15}$ n-alkanol, Neodol ® ethoxysulfates, Shell Chemical Co.); alkali metal salts of higher fatty esters of low molecular weight alkylol sulfonic acids, e.g., fatty acid esters of the sodium salt of isethionic acid; the fatty ethanolamide sulfates; the fatty acid amides of amino alkyl sulfonic acids, e.g., lauric acid amide of taurine; as well as numerous other anionic organic surface active agents such as sodium xylene sulfonate, sodium naphthalene sulfonate, sodium toluene sulfonate; and mixtures thereof.

A further useful class of anionic surfactants include the 8-(4-n-alkyl-2-cyclohexenyl)-octanoic acids wherein the cyclohexenyl ring is substituted with an additional carboxylic acid group. These compounds, or their potassium salts, are commercially-available from Westvaco Corporation as Diacid ® 1550 or H-240.

In general these organic surface active agents are employed in the form of their alkali metal salts or alkaline earth metal salts as these salts possess the requisite stability, solubility, and low cost essential to practical utility.

The use of amphoteric, and cationic detergents is also contemplated by the present invention. These detergents should, of course, be employed in a compatible proportion and manner, e.g., in the prepolymer resin, if appropriate.

Examples of amphoteric detergents which may be employed include the fatty imidazolines, such as 2-coco-1-hydroxyethyl-1-carboxymethyl-1-hydroxyl-imidazoline and similar products made by reacting monocarboxylic fatty acids having chain lengths of 10 to 24 carbon atoms with 2-hydroxyethyl ethylene diamine and with monohalo monocarboxylic fatty acids having from 2 to 6 carbon atoms, the fatty beta-alanines such as dodecyl beta-alanine, the inner salt of 2-trimethylamino lauric acid, betaines such as N-dodecyl-N,N-dimethylamino acetic acid and the like. Mixtures of any two or more of the foregoing may be employed.

A wide variety of cationic surface active agents may be employed in the compositions of the present invention, including the preferred di(higher)alkyldimethylbenzyl- or (substituted)benzyl ammonium salts wherein the (higher)alkyl group is a $C_{10}$-$C_{20}$-n-alkyl moiety.

Members of this class include stearyl (dimethylbenzyl)ammonium chloride, coco(dimethylbenzyl) ammonium chloride, lauryl(dimethylbenzyl) ammonium chloride and the like. Other useful cationic surfactants include dicoco(dimethyl)ammonium chloride, cetylpyridinium chloride, cetyltrimethyl ammonium bromide, the stearyl amine salts that are soluble in water such as stearyl amine acetate and stearyl amine hydrochloride, stearyl dimethylamine hydrochloride, distearyl amine hydrochloride, octyl phenoxyethoxyethyl(dimethylbenzyl)ammonium chloride, decyl pyridinium bromide, the pyridinium chloride derivative of the acetylaminoethyl esters of lauric acid and lauryl trimethyl ammonium chloride.

Silicone fluids may also be employed optionally as foam cell initiating and structuring agents and are selected from those which function to control cell size and aid reticulation. Useful classes of silicone fluids include the linear polymethylsiloxanes or the tetrameric or pentameric cyclic siloxanes (cyclomethicones) which are available from Dow Corning in a wide range of viscosities (i.e., 10–10,000 cps.) such as Dow Corning ® 200 fluid (50 cps). When used as a component of the present foams, about 0.1–20%, preferably 1–10% by weight of the aqueous phase of silicone fluid may be employed.

About 1–15% by weight of the aqueous phase may also consist of a nonpolar solvent such as kerosene, mineral spirits, paraffin oil or a similar aromatic or aliphatic hydrocarbon solvent or solvent mixture, which is dispersed by the action of the surfactant present and which functions to aid in the solubilization and removal of heavy grease and oil.

Minor amounts of other foam-compatible adjuvants, such as dyes, fragrances, flame retardants and the like, may be introduced into the present foam products in effective amounts either via the aqueous or resin phase or by treating the final product with the adjuvants as by spraying, mixing, etc. When employed in the present products, such adjuvants will commonly be present at a level of up to 5–10% by weight of the finished product.

Therefore, the foam products of the present invention are formed by mixing and foaming the prepolymer resin with the aqueous reactant phase.

A preferred aqueous reactant phase would comprise about 15–40% water, 40–60% by weight of abrasive particles which have been surface-treated with about 0.1–5% by weight of the abrasive of a silane-coupling agent, about 1–5% by weight of a nonionic surfactant, and optionally, about 0.5–5% of an anionic surfactant, about 2–10% of a silicone fluid and/or about 0–15% of a hydrocarbon solvent in admixture with minor amounts of dye and fragrance. The foam matrix of the cleaner product would typically be formed by mixing together the above-described aqueous phase with the prepolymer resin in a weight ratio of aqueous phase to prepolymer resin of about 20-1:1. The preferred mole ratio of water to moles of available isocyanate groups is thereby adjusted to be within the range of about 30-60:1.

In a typical procedure, a slurry is formed of about half of the total water and the abrasive particles which is then treated with the silane-coupling agent with stirring and heating sufficient to surface-coat the abrasive with the silane. The nonionic surfactant is added to the slurry along with the balance of the water and optionally, the silicone fluid, additional surfactants, hydrocarbon solvents and other adjuvants. The stirred aqueous phase is brought to about 60°-85° F. and blended in the desired weight ratio with the heated (70°-95° F.) prepolymer resin in the mixing chamber of a foam-spraying machine. The foaming, exotherming mixture is sprayed into open or closed forms and allowed to set at ambient temperatures. The resultant solids-loaded foam buns are shredded to yield the final product which is weighed and bagged for shipping.

The foam buns formed by this process are of relatively high density (i.e., about 0.2-0.6 g/cc) but have a much lower tensile strength than is normally desirable or obtained for other polyurethane-type foams. Buns of polyurethane foams which have been formulated so as to retain their integrity as, for example, sponges, abrasive pads, padding and the like typically exhibit tensile strengths of about 30-60 psi as measured by standard ASTM methods (D1623-72), whereas the foam buns of the present invention have tensile strengths of less than about 10 psi, preferably less than 8 psi, most preferably less than 3 psi. These low tensile strengths permit the buns to be facilly shredded without the expenditure of undue effort and yield shreds which are soft and somewhat self-adhering; properties which are useful to ensure complete coverage of a water and/or oil spill floor area and easy pickup of the saturated shreds after they have performed their cleaning function. The preferred shredded foam particle size for the present compositions is about 10-70 mesh (U.S. Standard Sieve series).

Foam buns as prepared within the above-described parameters yield shreds within a useful density range of about 0.5-0.1 g/cc, preferably 0.30-0.15 g/cc, as measured by gravity-tapping down a column of freshly prepared shreds three times at ambient temperature. The most dense shreds are prepared when the ratio of aqueous phase to prepolymer resin is at the higher portion of the useful range for any given proportion of abrasive incorporated within the aqueous phase. Lower ratios of aqueous phase to prepolymer will likewise produce less-dense, fluffier foams. For example, for an aqueous phase incorporating about 45-55% powdered mineral solids as the abrasive, the useful weight ratio of aqueous phase to a Hypol-type prepolymer is about 20:1 to about 1:1, preferably 10-2:1.

The invention will be further described by reference to the following detailed examples.

EXAMPLE I

A reaction kettle equipped with turbine stirring was charged with 80 lbs. of water and 424.08 lbs. of powdered F-4 feldspar was added with rapid stirring. A thick, flowable paste resulted. Another 20 lbs. of water was added, followed by slow addition of 2.20 lbs. of n-2-aminoethyl-3-aminopropyl-trimethoxysilane (Dow Z-6020). The mixture was heated to 75° F. via external steam heat with continued agitation. The slurry was sequentially treated with 14.48 lbs. Pluronic P-85, 25.5 lbs. Neodol 25-3S, 24 lbs. Dow 200 fluid (50 cps.), 118 lbs. water and 93.2 lbs. mineral spirits. The mixture was stirred for one hour to a rich foam-like consistency. The mixture was maintained at 78° F., while 50 gal. was introduced into the mixing chamber of a foam-spraying machine at a rate of 9.9 lbs./min. and mixed with 80 lbs. (85 eq NCO) of Hypol FHP-3000 which was heated to 90° F. and introduced into the chamber at a rate of 1.97 lbs./min. Portions of 3.8 lbs. were sprayed at a rate of 11.87 lbs./min. into 17.5"×3.5"×8" polyethylene-lined boxes to form 3.8 lb. buns which set and were deboxed after 5 min. The flexible buns were allowed to cool to room temperature and then were fed into a rotary blade shredder to form to 10-70 mesh shreds of an open-celled, dense foam.

Motor oil (2.0 g) was poured into a stainless steel ring centered on a stainless steel weighing pan and then cooled to 19° C. The ring was removed and the oil pool allowed to spread for 1.0 min. Shreds of the foam concrete cleaner (5.03 g) were sprinkled onto the oil and allowed to stand for 1.0 min. The excess foam was tapped off and the percentage of sample remaining attached to the oil (24.8%) was calculated as a measure of the absorbency of the sample, lower percentages indicating a higher absorbency. Kitty Litter (clay) gave a reading of 72.4%.

TABLE I

OIL-ABSORBING FOAM COMPOSITIONS

| INGREDIENT | WEIGHT PERCENT | | | | | |
|---|---|---|---|---|---|---|
| | A | B | C | D | E | F |
| Hypol FHP-3000 | 17.0 | 17.0 | — | 17.0 | 17.0 | 17.0 |
| TRE A31 | — | — | 17.0 | — | — | — |
| Water | 22.5 | 22.5 | 22.5 | 22.5 | 22.5 | 22.5 |
| Feldspar (0.5% Z-6020) | 44.0 | 44.0 | 44.0 | 44.0 | 44.0 | 44.0 |
| Dow 200 fluid (50 cps.) | 2.5 | 2.5 | 2.5 | 2.5 | 2.5 | 2.5 |
| Mineral Spirits | 10.0 | — | — | 10.0 | 10.0 | 10.0 |
| Pluronic P-85 | 1.5 | 1.5 | 1.5 | 1.5 | 1.5 | 1.5 |
| Kerosene | — | 10.0 | 10.0 | — | — | — |
| Neodol 25-3S | — | 1.0 | 1.0 | — | — | 1.0 |
| Petro AA | 2.5 | 1.5 | 1.5 | 1.5 | 1.5 | — |
| Westvaco H240 | — | — | — | — | — | 1.5 |
| Tergitol | — | — | — | 1.0* | 1.0** | — |
| Absorbency (% used) | 30.1 | 28.8 | 37.9 | 27.7 | 28.4 | 28.2 |

*15-5-12
**15-5-20

TABLE II

OIL ABSORBING FOAM COMPOSITIONS

| INGREDIENT | WEIGHT PERCENT | | | | | | | | | | |
|---|---|---|---|---|---|---|---|---|---|---|---|
| | G | H | I | J | K | L | M | N | O | P | Q |
| Hypol FHP-3000 | 17.0 | 10.0 | 21.0 | 30.0 | — | — | — | — | — | — | — |
| TRE A31 | — | — | — | — | 10.0 | 13.0 | 15.0 | 17.0 | 19.0 | 21.0 | 30.0 |
| Water | 22.59 | 22.50 | 21.50 | 19.05 | 24.50 | 23.61 | 23.14 | 22.59 | 22.05 | 21.50 | 19.05 |

TABLE II-continued

| | OIL ABSORBING FOAM COMPOSITIONS WEIGHT PERCENT | | | | | | | | | | |
|---|---|---|---|---|---|---|---|---|---|---|---|
| INGREDIENT | G | H | I | J | K | L | M | N | O | P | Q |
| Feldspar (0.5% Z-6020) | 44.14 | 47.85 | 42.01 | 37.22 | 47.85 | 46.25 | 45.19 | 44.14 | 43.07 | 42.01 | 37.22 |
| Dow 200 fluid (50 cps.) | 2.49 | 2.70 | 2.37 | 2.10 | 2.70 | 2.61 | 2.55 | 2.49 | 2.43 | 2.37 | 2.10 |
| Mineral Spirits | 9.64 | 10.46 | 9.18 | 8.13 | 10.46 | 10.11 | 9.88 | 9.64 | 9.41 | 9.18 | 8.13 |
| Pluronic p-85 | 1.50 | 1.63 | 1.43 | 1.27 | 1.63 | 1.58 | 1.54 | 1.50 | 1.47 | 1.43 | 1.27 |
| Neodol 25-3S | 2.64 | 2.86 | 2.51 | 2.23 | 2.86 | 2.77 | 2.70 | 2.64 | 2.57 | 2.51 | 2.23 |
| Bun g/cc | 0.26 | 0.43 | 0.22 | n.t. | 0.58 | 0.50 | 0.37 | 0.3 | 0.27 | 0.27 | 0.2 |
| Shredded Foam g/cc | 0.22 | 0.30 | 0.17 | 0.14 | 0.36 | 0.29 | 0.27 | 0.25 | 0.24 | 0.23 | 0.17 |

Tables I and II summarize the compositions of seventeen formulations which were foamed and shredded to yield effective oil-absorbing foam compositions as indicated by the absorbency value numbers at the end of columns A-F, which were calculated by the method of Ex. I. Exs. A-F were foamed and shredded as described in Ex. I. Exs. G-Q on Table II were prepared by heating the water phase to 88° C., adding the polymer at 100°–105° C. and blending 100 g of the mixture for 10 seconds (no. 5 setting on RW-20 mixer). The foam was allowed to rise and set in situ. Then weighed, shredded, the shreds tapped down three times in a columnar container and the density of the shredded product calculated. These shreds exhibit suitable oil absorbency for both surface and absorbed spills.

A single foam shred prepared according the procedure of Ex. G is shown in FIG. 1, which is a photographic enlargement (30×). The open-cellular structure of the foam is clearly apparent. As is demonstrated by the Figure, the window membranes are largely broken and remain adhered to the interconnecting cell matrix strands in ragged globular masses, producing a shred of high surface area and good wicking power.

Figure 2:
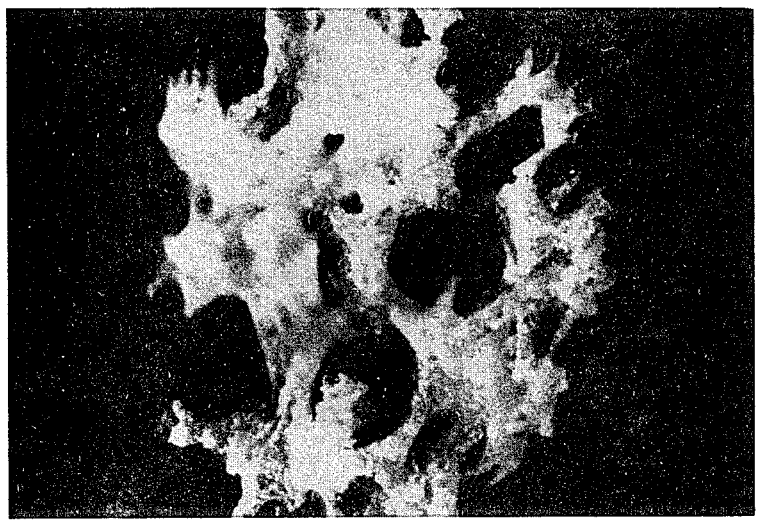
Figure 3:
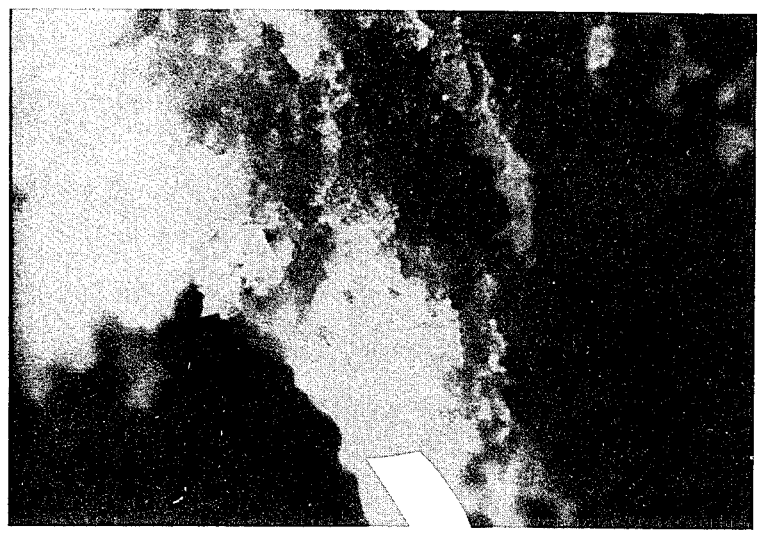

A single foam shred prepared according to the procedure of Ex. J is shown in FIG. 2, in photographic enlargement (30×). Since more Hypol resin relative to the amount of aqueous phase was employed to prepare this foam, it is less dense than the shred illustrated in FIG. 1. The cell volume is larger and the adhered cell window has been broken in an extremely jagged fashion. This shred is similar in structure to shreds prepared according to Example 1, which are characterized by optimal oil absorbency and extremely high surface area.

A single foam shred prepared using 10% TRE A31 resin (Ex. K) is photographically illustrated in FIG. 2 (30× magnification). This dense foam has its open cells nearly filled with globular masses of the broken cell windows, which are formed mostly of polymer coated solid particles. Although the wicking action of these shreds is satisfactory, the more globular forms assumed by the cell-window fragments lowers the cell volume and apparent shred surface area to a considerable extent.

Figure 4:
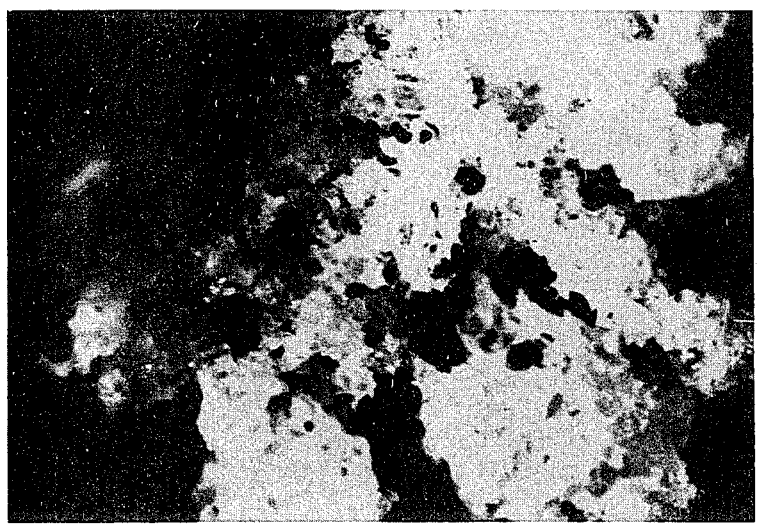

A single foam shred prepared using 30% of TRE A31 resin (Ex. Q) is photographically illustrated in FIG. 4. (30× magnification). These foam shreds are only about one-third as dense as the shreds of Ex. 7. The cellular voids are more clearly defined and the adhered cell-window fragments are jagged and somewhat fibrous. These shreds exhibit rapid oil wicking and high absorbency.

The invention has been described with reference to various specific and preferred embodiments and techniques. However, it should be understood that many variations and modifications may be made while remaining within the spirit and scope of the invention.

We claim:

1. A concrete cleaning composition comprising shreds of a water and oil absorbent hydrophilic, open-celled, polyurethane foam, said foam comprising broken cell walls adhered to a reticulated cell matrix, wherin the cell walls incorporate an aqueous phase and abrasive particles coupled within said walls, and wherein said shreds are obtained from a friable foam bun having a tensile strength of less that about 10 psi.

2. The composition of claim 1 wherein said shreds have a density of about from 0.5–0.1 g/cc and a shred size of about 10–70 mesh.

3. The composition of claim 1 wherein said shreds incorporate about 30–95% by weight of said abrasive particles on a dry weight basis.

4. The composition of claim 1 wherein said abrasive particles are coupled to said foam with an effective amount of a silane-coupling agent.

5. The composition of claim 1 wherein the aqueous phase comprises a surfactant and a dispersed nonpolar solvent.

6. The composition of claim 5 wherein the surfactant is a nonionic surfactant and the solvent is a hydrocarbon solvent.

7. The composition of claim 1 wherein said foam shreds substantially have a structure selected from those shown in FIGS. 1–4.

8. A process for preparing an oil and water absorbent concrete cleaning composition comprising:
 (a) forming an aqueous reactant phase comprising about 25–60% by weight of abrasive solid particles, about 0.1–5% of the weight of the solid particles of a silane-coupling agent, about 0.1–10% of a nonionic surfactant and about 20–50% water;
 (b) mixing said aqueous reactant phase with a water-foamable prepolymer resin which contains at least 2 free isocyanate groups per resin molecule so that the final mole ratio of water to total free isocyanate groups is within the range of about 5–100:1, thereby converting said resin into a hydrophilic, open-celled, highly reticulated polyurethane foam bun; and
 (c) shredding said foam bun.

9. The process of claim 8 wherein said shredded foam has a density of about 0.5–0.1 g/cc and a shred size of about 10–70 mesh.

10. The process of claim 8 wherein the aqueous reactant phase further comprises about 1–10% by weight of a silicone fluid and about 0.5–5% by weight of an anionic surfactant.

11. The process of claim 10 wherein the aqueous phase further comprises about 1–15% of a hydrocarbon solvent.

12. The process of claim 8 wherein said aqueous reactant phase is formed by slurrying the solid particles with about half of the water, adding the silane-coupling agent, stirring and heating the water phase to 70°–80° F. and adding the surfactant and the remainder of the water.

13. The process of claim 8 wherein the solid particles comprise silaceous mineral particles and said silane-coupling agent is an aminoalkyl(tris-alkoxy)silane.

14. A process for preparing an oil and water absorbent concrete cleaning composition comprising:
   (a) forming an aqueous reactant phase comprising about 15–40% by weight of water, about 0.1–10% of a nonionic surfactant, about 0.5–5% by weight of an anionic surfactant, about 1–10% by weight of a polysiloxane silicone fluid, about 1–15% of a hydrocarbon solvent, about 25–60% of abrasive mineral particles, and about 0.1–5% by weight of the mineral particles of an aminoalkyl(tris-alkoxy)-silane-coupling agent;
   (b) mixing said aqueous reactant phase with a water-foamable prepolymer resin in a weight ratio of aqueous phase to prepolymer of about 20–1:1, said prepolymer resin comprising a toluene diisocyanate-capped polyalkoxylene ether polyol having a molecular weight within the range of about 1300–1400 and comprising about 1.5–2.5 mEq/g of isocyanate groups, so as to convert such resin into a hydrophilic, open-celled, friable polyurethane foam bun having a tensile strength of less than about 10 psi; and
   (c) shredding said bun into foam shreds having a density of about 0.5–0.1 g/cc.

15. The process of claim 14 wherein the nonionic surfactant comprises the condensation product of a polyoxypropylene ether and polyoxyethylene ether wherein the polyoxypropylene ether has a molecular weight of about 1500–3000 and the polyoxyethylene content is about 35–55% by weight of the surfactant molecule, and wherein the anionic surfactant comprises an alkali metal salt of sulfated ethylenoxy-derivatized fatty alcohols.

16. The process of claim 14 wherein the weight range of aqueous phase to prepolymer resin is about 10–2:1, and wherein the abrasive mineral particles comprise about 45–55% by weight of the aqueous phase.

17. A cleaning composition prepared according to the process of claim 14 wherein the foam shreds substantially have a structure selected from those shown in FIGS. 1–4.

18. A method for dispersing a solid particulate material having surface hydroxyl groups in a hydrophilic polyurethane foam matrix comprising:
   (a) forming an aqueous slurry of said particulate material in water;
   (b) treating said slurry with about 0.1–5% by weight of the particulate material of a silane-coupling agent comprising amino or ureido groups and functional groups which are converted to silanol groups upon hydrolysis;
   (c) heating the slurry to a temperature effective to hydrolyze said functional groups and to bind said silanol groups to said surface hydroxyl groups;
   (d) mixing said slurry with a foamable prepolymer resin comprising free isocyanate groups whereby said amino groups couple with said isocyanate groups; and
   (e) foaming said resin to form a polyurethane foam.

19. The method of claim 18 wherein the silane-coupling agent has the formula:

wherein R is an amino or ureido group, n is 1 or 2, m is 0–3 and X is selected from the group consisting of methoxy, ethoxy, 2-methoxyethoxy and acetoxy.

20. The method of claim 18 wherein the particulate material comprises a powdered silicate or aluminate mineral.

21. The method of claim 18 wherein the resin comprises an aromatic isocyanate-capped mixture of a polyol comprising about 3–8 hydroxy groups and a polyoxyethylene diol, said resin having a molecular weight of about 1300–1400 and having about 1.5–2.5 mEq/g of free isocyanate groups.

22. The method of claim 20 wherein the aqueous slurry comprises up to about a 500% weight excess of particulate material over the total weight of the water used.

23. The method of claim 18 wherein the slurry is heated to about 70°–90° F. to hydrolyze the functional groups to silanol groups.

24. A method of removing oil from concrete comprising applying to the oil the composition of claim 1.

* * * * *